Jan. 26, 1971  M. K. SNYDER  3,557,503
WALL PANEL STRUCTURE AND METHOD OF MAKING SAME
Filed July 3, 1968  3 Sheets-Sheet 1

INVENTOR
MARVIN K. SNYDER

BY Shoemaker and Mattare

ATTORNEYS

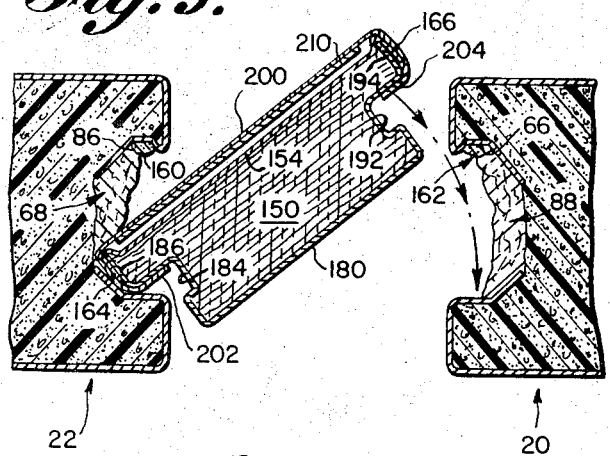
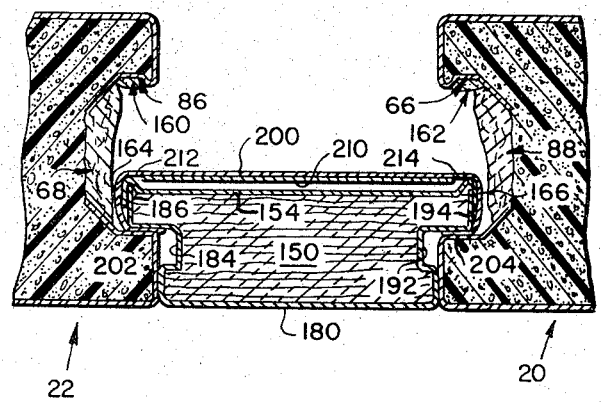
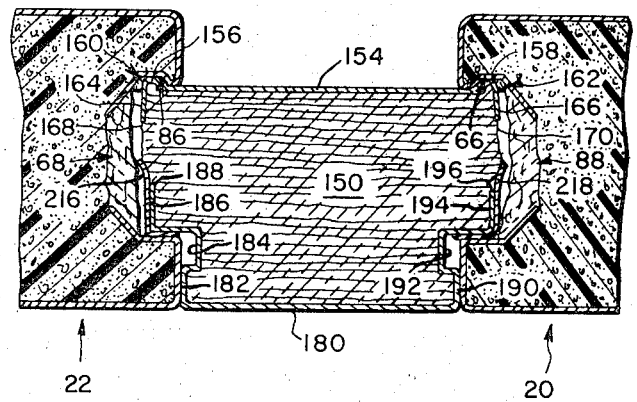
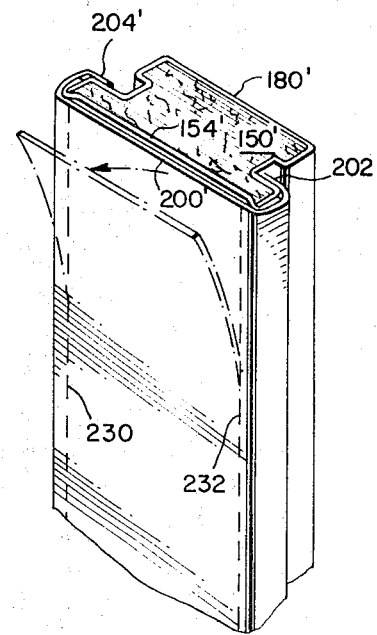
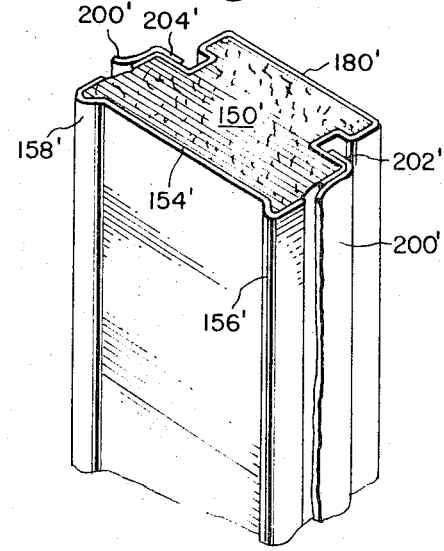
INVENTOR
MARVIN K. SNYDER

Jan. 26, 1971 M. K. SNYDER 3,557,503
WALL PANEL STRUCTURE AND METHOD OF MAKING SAME
Filed July 3, 1968 3 Sheets-Sheet 3

INVENTOR
MARVIN K. SNYDER

BY Shoemaker and Mattare
ATTORNEYS

United States Patent Office 3,557,503
Patented Jan. 26, 1971

3,557,503
WALL PANEL STRUCTURE AND METHOD
OF MAKING SAME
Marvin K. Snyder, Overland Park, Kans., assignor to
Butler Manufacturing Company, Kansas City, Mo., a
corporation of Missouri
Filed July 3, 1968, Ser. No. 742,458
Int. Cl. E04c 1/10
U.S. Cl. 52—173                                             26 Claims

ABSTRACT OF THE DISCLOSURE

Adjacent spaced panels of a wall structure are provided with elongated longitudinally extending grooves in the facing edges of the panels for receiving opposite laterally extending portions or tongues on opposite sides of a spline means to provide a rigid sealed joint therebetween. The spline means comprises a resilient compressible core or body part with opposite rigid face or shell means thereon. The spline means may be precompressed and retained in such state by a retaining member of frangible material which is severed after the spline is inserted in place thereby allowing the spline to expand into final assembled position.

BACKGROUND OF THE INVENTION

The present invention relates to a wall panel structure for use preferably as an exterior wall of various structures such as commercial or industrial buildings, stores, homes and the like. It is apparent that this construction may also be used as an interior wall if so desired.

The panels employed in the present invention may comprise so-called "sandwich panels" including a semi-rigid core portion having relatively rigid outer and inner shells thereon. These panels are erected at the job site and retained in operative position by suitable spline means connected between adjacent panels. These panels may be on the order of five feet in width and twenty feet in height with a spacing of about two inches between the side edges of adjacent panels.

The use of splines between adjacent wall panels allows for panel tolerances, enables sealing of the joint, and further enhances the esthetic effect. These splines also allow a space for door and window mullions as well as small vertical load carrying columns and similar accessories.

In the prior art, the panels and splines are conventionally assembled in a sequential manner, and the splines are of such a construction that it is difficult or impossible to initially assemble the panels in spaced relationship to one another and then subsequently insert the spline in operative position.

It is important that the finished wall construction provide a good air and watertight seal over extended periods of time. In the past, conventional arrangements have not afforded a positive seal between the spline and the adjacent panels for providing the desired seal.

Known spline arrangements are generally of a rigid construction or have faces adhesively bonded to a core resulting in higher costs and do not enable ready compensation for misalignment of the associated panels nor do they accommodate variations in panel thickness and width of the spline groove in the panel.

Known spline constructions cannot be readily compressed for reducing the amount of shipping space required, and additionally the prefinished surfaces of the splines may be damaged during shipping and erection thereof into operative position.

SUMMARY OF THE INVENTION

In the present invention, certain forms of the spline are adapted to be readily inserted in operative position relative to panels which have already been assembled in predetermined spaced relationship to one another. This is accomplished in the present invention by providing recessed areas or grooves in the sides of the spline so that it can readily clear the adjacent panel structure.

The invention spline includes a central portion or core of resilient compressible material carrying inner and outer relatively thin rigid shell or face means on the back and front surfaces thereof, respectively. The central portion or core of the spline is compressed and the spline is then inserted in operative position within a groove in an associated panel, whereupon the resilient central portion of the spline is allowed to expand into final operative position. This creates positive and continuing force urging the laterally extending portions of the spline into engagement with portions of the associated grooves. In addition to this positive and continuing force, a sealing material may be disposed between the spline and portions of the groove to ensure that a good air and watertight seal will be maintained at all times.

The outer and inner rigid shell or face means on opposite surfaces of the central portion of the spline are so constructed that the adjacent edges of the shell or face means are spaced from one another when in operative position. This enables the opposite shell or face means of the spline to move independently of one another in a lateral direction to compensate for misalignment of associated panel faces and to also move transversely to accommodate variations in panel thickness and width of the spline groove in the associated panels.

In some forms of the invention, the spline is initially precompressed and maintained in this compressed condition by a suitable retaining means. Accordingly, the spline may be shipped in this compressed condition thereby substantially reducing the space required during shipping procedures. The retaining means preferably takes the form of foil or a film of material. This foil or film of material serves as a protective interleaving between adjacent splines which serves to protect the prefinished surfaces of the spline during shipping and erection thereof.

BRIEF DESCRIPTION OF THE DRAWINGS

FIG. 5 is a sectional view illustrating the manner in which a modified form of spline according to the present invention is inserted in operative position;

FIG. 6 is a sectional view similar to FIG. 5 illustrating a further step in the insertion of the spline into operative position;

FIG. 7 is a sectional view similar to FIGS. 5 and 6 illustrating the spline in its final operative relationship;

FIG. 8 is a top perspective view of a further modified form of spline according to the present invention;

FIG. 9 is a view of the spline illustrated in FIG. 8 after the retaining means thereof has been severed;

DESCRIPTION OF THE PREFERRED EMBODIMENTS

Figure 1:
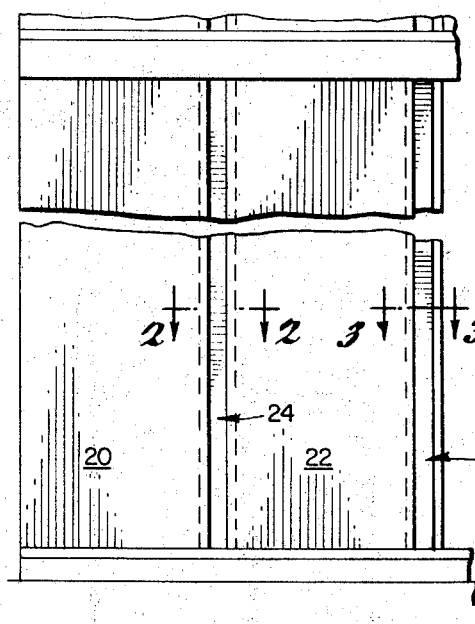
FIG. 1 is a front view of a portion of a wall panel structure according to the present invention.

Referring now to the drawings wherein like reference characters designate corresponding parts throughout the several views, a first form of the invention is illustrated in FIGS. 1–4 inclusive. Referring particularly to FIG. 1, a wall panel structure is illustrated including a pair of adjacent spaced panels 20 and 22. As shown in FIG. 1, panels 20 and 22 are interconnected with one another by a spline indicated by reference numeral 24, and a further spline 26 is inserted within a suitable groove provided at the right-hand side of panel 22. In this particular form of the invention, the panels and splines are assembled in a sequential manner, or in other words, a panel is placed in position, and a spline operatively interconnected therewith, whereupon a second panel is then interconnected with the spline, and so forth throughout the length of the wall structure.

Figure 2:
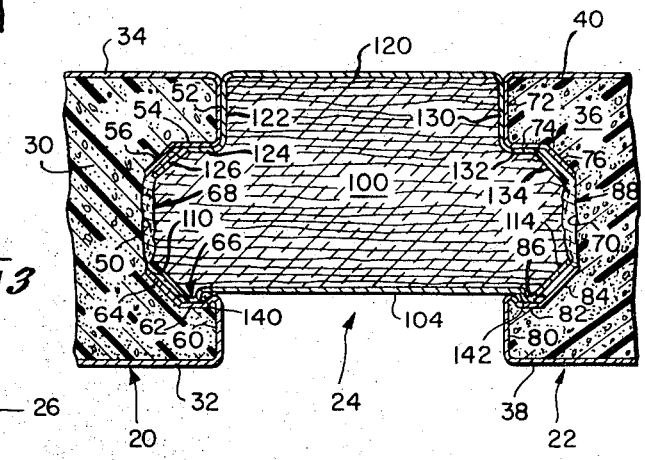
FIG. 2 is an enlarged sectional view taken substantially along line 2—2 of FIG. 1 looking in the direction of the arrows.

As seen in FIG. 2, the wall panels are of the so-called "sandwich panel" construction. The panel 20 includes a central core portion 30 which may typically be formed of foamed polyurethane or the like. Outer relatively rigid thin shells 32 and 34 are carried on the opposite faces of the core portion 30, these shells being formed of steel or the like.

The panel 22 is of similar construction including a core portion 36 having shells 38 and 40 carried on the opposite surfaces thereof. The shells are suitably bonded to the associated core portions.

Each of the panels is provided with a groove extending longitudinally along each of the opposite side edges thereof. As seen in FIG. 2, one side edge of panel 20 is provided with a longitudinally extending recessed portion 50.

The shell 34 includes an inwardly extending portion 52 disposed at the edge of the panel, this portion 52 joining with a portion 54 extending substantially parallel with the outwardly facing portion of shell 34. A portion 56 extends angularly from the portion 54 to a point adjacent the bottom of the recessed portion 50.

The shell 32 includes an inwardly extending portion 60 which joins with a portion 62 disposed substantially parallel with the outwardly facing portion of shell 32. This portion 62 in turn joins with an angularly extending portion 64 which extends to a point adjacent the bottom of recessed portion 50.

The portions 60, 62 and 64 cooperate to define a longitudinally extending rigid recess 66 for a purpose hereinafter described. It will also be noted that the poritions 54 and 56 as well as the portions 62 and 64 disposed within the recessed portion 50 cooperate to define a longitudinally extending groove formed in the side edge of the panel.

A resilient gasket means 68 formed of glass fibers or the like is disposed in the bottom of recessed portion 50 and extends throughout the longitudinal length thereof for a purpose hereinafter described.

The opposite panel 22 is of a construction similar to that of panel 20. A recessed portion 70 is provided in the side edge thereof and extends longitudinally throughout the length of the panel. The shell 40 includes an inwardly extending portion 72 formed along the side edge of the panel which joins with a portion 74 disposed substantially parallel with the outwardly facing part of shell 40. A portion 76 extends angularly from portion 74 and terminates at the bottom of the recessed portion 70.

The shell 38 includes an inwardly extending portion 80 which joins with a portion 82 disposed substantially parallel with the outwardly facing portion of shell 38. A portion 84 extends angularly from portion 82 and terminates at the bottom of the recessed portion 70. The portions 80, 82 and 84 cooperate to define a longitudinally extending rigid recess indicated by reference character 86 for a purpose hereinafter described.

It is apparent that the portions 74, 76 and 80, 84 cooperate with the recessed portion 70 of the panel to define a longitudinally extending groove in the side edge of the panel.

A resilient gasket means 88 formed of glass fibers or the like is disposed within the bottom of this groove and extends longitudinally throughout the length thereof for a purpose hereinafter described.

Figure 4:
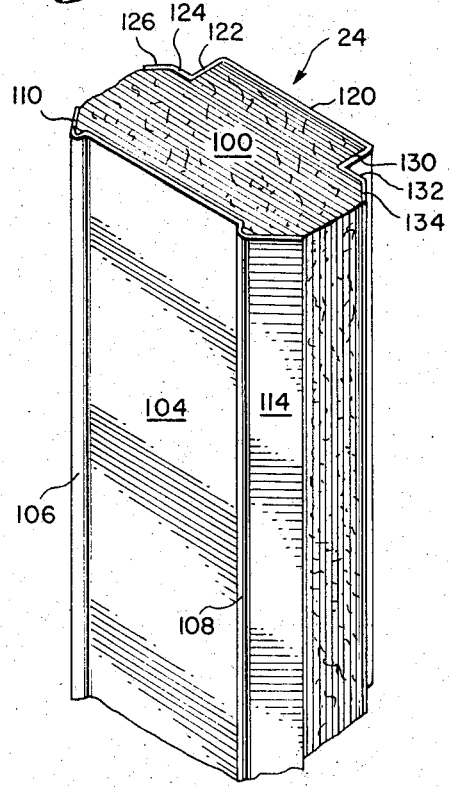
FIG. 4 is a top perspective view of a spline as illustrated in FIGS. 2 and 3.
Figure 3:
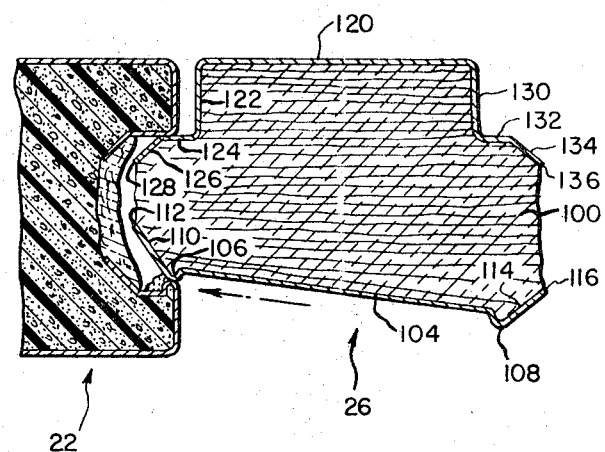
FIG. 3 is an enlarged sectional view taken substantially along line 3—3 of FIG. 1 looking in the direction of the arrows and illustrating the manner in which a spline is inserted in operative position.

As seen most clearly in FIGS. 2–4 inclusive, the spline in this form of the invention includes a generally T-shaped central resilient compressible portion or core 100. This central portion may be formed of a flexible cellular plastic or rubber material, or in cases where greater heat and fire resistance is required, it can be a fibrous glass material bonded with thermosetting resins. The compressible core comprises an enlarged body part having laterally projecting tongues at opposite sides thereof.

A relatively thin outer or front shell or face means 104 is disposed at one surface of the spline and may be formed of steel or the like. This outer shell or face means includes a pair of spaced longitudinally extending projections or ribs 106 and 108 which are adapted to be received within the recesses 66 and 86 respectively of the grooves formed in the facing edges of the associated panels.

One side portion 110 of the outer face means is adapted to be disposed adjacent the portion 64 of the shell 32 previously described, portion 110 extending at least partially over the tongue and terminating in an edge 112. The opposite side portion 114 of the outer face means is adapted to be disposed adjacent the portion 84 of the shell 38 previously described, portion 114 extending at least partially over the tongue and terminating in an edge 116.

A relatively thin inner or back shell or face means 120 formed of steel or the like is disposed at the opposite surface of the spline. This inner face means includes a portion 122 adapted to be disposed closely adjacent to the portion 52 of shell 34. Portions 124 and 126 of the inner face means are adapted to be disposed adjacent the shell portions 54 and 56 respectively and at least partially over the tongue. Portion 126 of the inner face means terminates in an edge 128.

Face means or shell 120 also includes a portion 130 adapted to be disposed adjacent the shell portion 72 of panel 22. The portions 132 and 134 of the inner face means are adapted to be disposed adjacent shell portions 74 and 76 respectively and at least partially over the other tongue. Portion 134 of the inner face means terminates in an edge 136.

The inner and outer shells or face means may be suitably bonded to the opposite surfaces of the central portion of the spline.

It will be noted that the adjacent edges 128 and 112 of the inner and outer face means respectively are spaced from one another, and similarly the adjacent edges 136 and 116 thereof are spaced from one another. This permits the central resilient compressible portion 100 to be compressed when inserting the spline in operative position.

As seen in FIG. 2, the outwardly facing shells 34 and 40 as well as the central part of the inner or back shell or face means 120 are disposed substantially flush with one another and constitute an inner surface of a wall, while the opposite shell portions 32 and 38 as well as the central part of the outer face means 104 will be disposed outwardly of the structure, or exposed to the elements in the case of an exterior wall of a building or the like.

As seen particularly in FIG. 2, suitable bodies of sealing material 140 and 142 are positioned longitudinally within recesses 66 and 86 respectively throughout the length thereof. This sealing material may be a conventional caulking compound, and in the final operative position as shown in FIG. 2 will serve to provide a good air and watertight joint at these recesses which receive the projections 106 and 108 of the outer face means.

The same panel face configuration may be employed on the inner side of a panel as on the outer side thereof. In other words, as seen in FIG. 2, outer shells 32 and 38 may also be used in place of shells 34 and 40.

A special decorative coating is ordinarily provided on the exterior of the panel or wall. By making both faces of the panel the same, the stocking arrangement is simplified and either face of the panel may be used as the exterior side thereof. The exterior coating is quite thick and can cover small dents and scratches that might show through a standard type of coating. Additionally, the recess formed in the face may be used for applying a caulking material that would serve as a vapor barrier. This seal would prevent interior moisture from migrating into the joints where it could freeze and create problems. A double seal would then be provided affording protection from air and water from the outside and water vapor from the inside.

As seen in FIG. 3, the manner of assembling the spline is illustrated. The left-hand side of the spline has been compressed so that it may be slipped into the groove provided in the side edge of panel 22. After it has been slipped into place, the compressive force is released thereby allowing the spline to expand into its final position shown in FIG. 2. The opposite right-hand side of the spline will then be compressed, and the panel 22 may be moved into the final operative position shown in FIG. 2 whereupon the spline is allowed to expand into the position shown. In this form of the invention, the panels and splines are sequentially operatively associated with one another and the angularly extending side portions 110, 114, 126 and 134 function as guide surfaces to aid in assembling the spline to the wall panel.

It will be noted that the spline means includes laterally extending portions at opposite sides thereof which are received within the grooves formed in the facing edges of the adjacent spaced panels, and in the final assembled position as shown in FIG. 2, the gasket means 68 and 88 engage these laterally extending portions of the spline means to provide an additional seal therewith.

In the final assembled position of the spline with respect to the adjacent panels, a very effective mechanical interlocking of the panels is obtained, and in addition a very good air and watertight joint is obtained. A further advantage of the present invention is the fact that the finished panel provides a very pleasing esthetic effect.

Referring now to FIGS. 5–7 inclusive, a modified form of the invention is illustrated. The panels 20 and 22 illustrated in connection with this form of spline are identical with those previously described, as well as the gasket means 68 and 88.

The spline in this form of the invention includes a generally T-shaped central portion or core 150 which is formed of resilient compressible material similar to the central portion 100 previously described. An outer or front shell or face means 154 is positioned at one side of the central portion. In this form of the invention, the inner face means and the outer face means need not be bonded or otherwise secured to the material of the central portion of the spline since retainer means hereinafter described is incorporated with the structure to retain the various components of the spline in operative relationship with respect to one another.

The outer face means 154 has a pair of spaced longitudinally extending projections 156 and 158 formed thereon which are adapted to be received within the recesses 86 and 66 of panels 22 and 20 respectively. Suitable bodies of sealing material 160 and 162 are received within the recesses 86 and 66 respectively to provide an effective air and watertight seal in the manner previously described.

A pair of inwardly extending portions 164 and 166 are formed integral with the outer face means 154 and terminate in the edges 168 and 170 respectively.

An inner face means 180 is disposed at the opposite surface of the central portion 150 of the spline. A portion 182 is formed integral with and extends inwardly from one side of the inner face means and defines a recessed area 184, and the innermost portion 186 terminates in an edge 188.

Similarly, a portion 190 is formed integral with and extends inwardly from the opposite side of the inner face means and defines a recessed area 192. The innermost portion 194 terminates in an edge 196.

This form of the spline is of such a construction that it is adapted to be precompressed and retained in such precompressed condition by a retaining means. The retaining means comprises an elongated member 200 having opposite portions 202 and 204 thereof suitably secured to the side portions of the inner face means extending over the laterally projecting tongues as seen most clearly in FIG. 5. These opposite portions may be secured in the operative position illustrated by a suitable adhesive substance or the like. This retaining means may comprise aluminum foil or other suitable substances which are frangible and can be readily severed as hereinafter described. The intermediate portions of this retaining member extend around the outer face means so as to retain the over-all spline in the compressed condition illustrated in FIGS. 5 and 6.

In this form of the invention, the panels may be disposed in predetermined spaced relationship with respect to one another, and the spline subsequently inserted into operative relationship as indicated in FIG. 5. As shown in this figure, the laterally extending portion at the left-hand side of the spline has been inserted within the groove in panel 22, and the spline is being swung in the direction of the arrows into the operative position as shown in FIG. 6. The recessed portions 184 and 192 at opposite sides of the spline facilitate this manner of assembly since they provide clearance with respect to adjacent portions of the associated panels to enable this swinging movement to be carried out.

After the spline has been swung into the operative position shown in FIG. 6, the retaining means must be severed at spaced longitudinal portions thereof to remove a central portion of the retaining means and to allow the spline to expand into the position shown in FIG. 7.

In order to enable the retaining means to be properly severed, in this form of the invention a layer of reinforcing material 210 is suitably secured to the central portion of the retaining means and extends longitudinally thereof. This retaining member may be formed of any suitable substance such as foil, film, kraft paper and the like, and may be suitably secured to the retaining means by an adhesive substance or the like. Accordingly, the central part of the retaining means is reinforced and, if one manually grasps an end portion of the retaining means and pulls it away from the spline, the retaining means will tend to separate along the areas indicated by reference characters 212 and 214 in FIG. 6. It is apparent that the central part of the retaining means will be completely removed leaving portions 216 and 218 as indicated in FIG. 7 within the grooves after the spline has expanded into the final operative position.

It will be noted as seen in FIGS. 5 and 6 that the portions 164, 166 of the outer face means are adapted to telescopically receive the portions 186, 194 of the inner face means when the spline is in its compressed condition. The spline can subsequently freely expand into the operative position shown in FIG. 7.

Referring now to FIG. 8, a further modified form of the invention is illustrated. The spline in this form of the invention is substantially identical with that shown in FIGS. 5, 6 and 7, and similar components have been given the same reference numerals primed. The only difference in this form of the invention is the manner in which means is provided for facilitating severing of the retaining means along certain areas thereof. Instead of providing a reinforcing layer 210 on the retaining member, the retaining member is provided with perforated tear lines 230 and 232 extending longitudinally thereof at spaced portions thereof. Accordingly, when one end of the retaining means is grasped and pulled away from the spline, it can be torn so that the central portion of the retaining means will be removed along the lines 230 and 232 as indicated in phantom lines in FIG. 8, thereby allowing the spline to expand into the final position as shown in FIG. 9.

Figure 12:
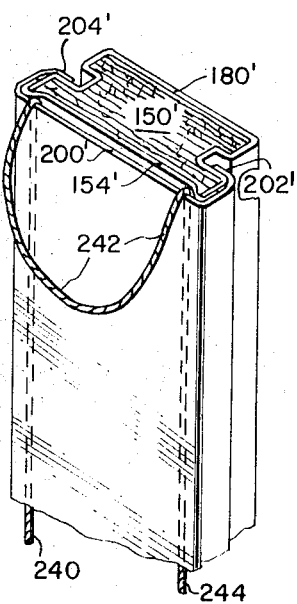
FIG. 12 is a top perspective view of still another modified form of spline according to the present invention.

Referring now to FIG. 12, still another form of the invention is illustrated. This spline is substantially identical to that shown in FIGS. 5 and 6, and similar parts have been given the same reference numerals primed. The only difference in this form of the invention is the means for facilitating severing of the retaining member along certain areas thereof.

Rather than providing either a reinforcing means or perforated tear lines, a tear string means is provided in this form of the invention. A tear string portion 240 extends upwardly adjacent one longitudinal edge of the spline and then joins with a bight portion 242 which in turn joins with a further longitudinally extending tear string portion 244. This tear string means may be operatively connected with the retainer member in a suitable manner. When it is desired to permit the spline to expand into operative position, the bight portion 244 is pulled downwardly to remove the central part of the retaining member, whereupon the spline can expand into operative position as previously described.

Figure 10:
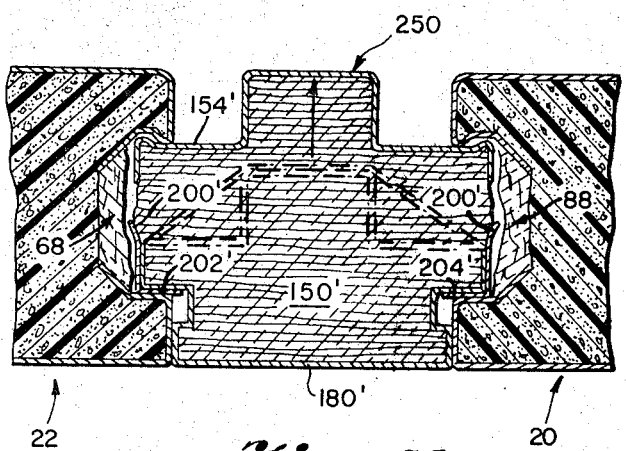
FIG. 10 is a sectional view illustrating a further modified form of the invention.

Referring now to FIG. 10 of the drawings, still another form of the invention is illustrated. This form of the invention is substantially the same as that as shown in FIG. 7, and accordingly similar parts have been given the same reference numerals primed. In this form of the invention, the only difference from that shown in FIG. 7 is the provision of a central longitudinally extending rib 250 formed on the outer face means 154' giving the spline the shape of a cross when viewed in cross-section. This rib is provided principally for esthetic reasons and is employed for enhancing the appearance of the finished outer surface of the wall structure.

Figure 11:
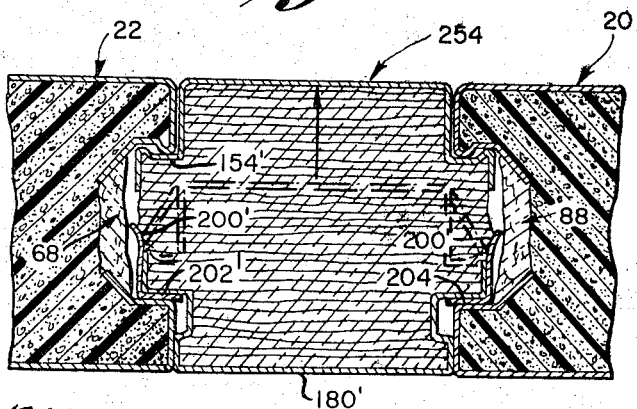
FIG. 11 is a sectional view illustrating still another modified form of the invention.

Referring now to FIG. 11, this structure is also very similar to that shown in FIG. 7, and similar parts have been given the same reference numerals primed. The only difference of this form of the invention is the fact that the outer face means includes a large central rib 254 which substantially fills the space between the adjacent associated panels to thereby provide a flush outer surface as well as a flush inner surface to the completed wall panel structure.

Figure 14:
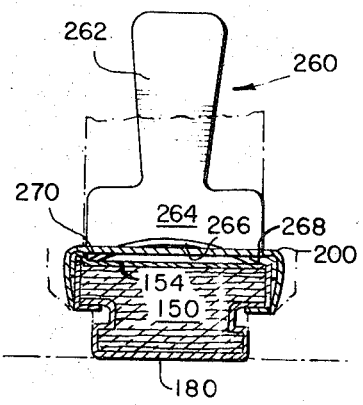
FIG. 14 is a sectional view taken substantially along line 14—14 of FIG. 13 looking in the direction of the arrows.
Figure 13:
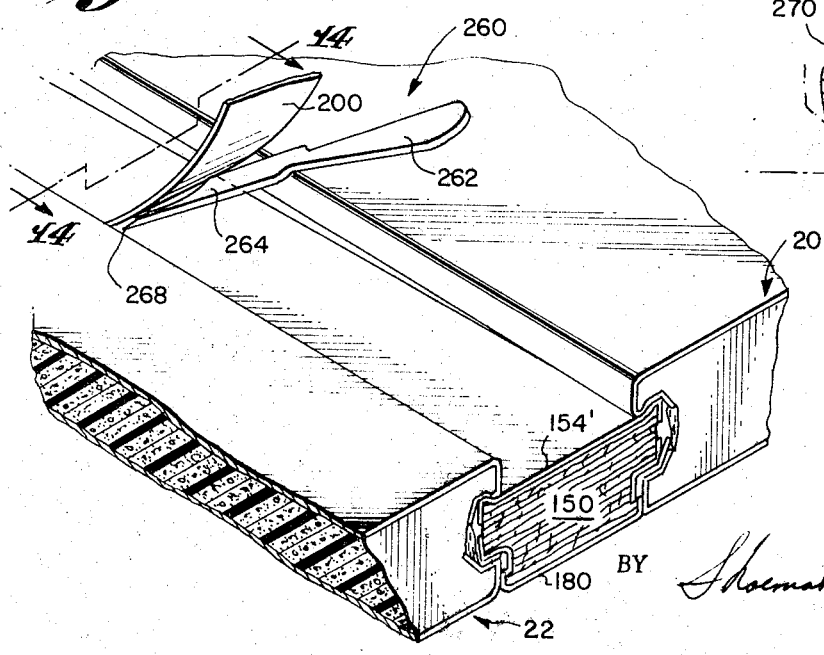
FIG. 13 is a top perspective view illustrating the manner in which a spline according to the present invention is inserted in operative position.

Referring now to FIGS. 13 and 14, a spline is illustrated which is substantially identical with that shown in FIGS. 5, 6 and 7 with the exception that the reinforcing member 210 may be eliminated if so desired, although this reinforcing member may also be employed in this embodiment of the invention. FIGS. 13 and 14 illustrate the manner in which a spline can be effectively operatively associated with a pair of adjacent panels 20 and 22 as previously described. The spline is first assembled into the operative position shown in FIG. 6, whereupon the retaining member 200 is severed with the utilization of a tool indicated generally by reference numeral 260.

This tool includes a handle portion 262 and an operating portion 264 having an arcuate end 266 which defines at opposite sides thereof a pair of spaced sharp cutting edges 268 and 270.

It is apparent that when tool 260 is moved longitudinally along the spline as illustrated in FIG. 13, it will sever the retaining member 200 at spaced longitudinal portions thereof allowing the spline to expand into the operative position as illustrated. This arrangement enables the spline to be moved into its final operative position in a most simple and effective manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A spline for a wall panel structure comprising a precompressed core formed of resilient compressible material, an outer face means disposed on one surface of said core and comprising a shell of relatively thin substantially rigid material, inner face means disposed on the opposite surface of said core and comprising a shell of relatively thin substantially rigid material, laterally extending tongues on opposite sides of said spline, and retaining means disposed over at least one of said face means and over said laterally extending tongues to hold said spline in its precompressed condition, said retaining means being frangible such as to be readily broken to enable said resilient core to expand to move said face means apart relative to one another.

2. The spline as defined in claim 1 wherein the inner and outer face means terminate in longitudinal edges at opposite sides thereof, the adjacent side edges of said inner and outer face means spaced from one another.

3. The spline, as defined in claim 1 wherein said outer face means includes spaced longitudinally extending ribs thereon.

4. The spline as defined in claim 1 wherein said spline includes recessed areas in opposite sides thereof to facilitate assembly of the spline with respect to associated panels.

5. The spline as defined in claim 1 wherein the adjacent edges of said inner and outer face means have a telescopic relationship with one another when said core of the spline is compressed.

6. The spline as defined in claim 1 wherein said retaining means includes an elongated frangible member having laterally extending spaced side portions thereof secured to one of said face means with the intermediate portions of said member between said side portions being disposed in overlying relationship to the other of said face means.

7. The spline as defined in claim 6 wherein said spaced portions are secured to said inner face means.

8. The spline as defined in claim 1 including means for facilitating severing of said retaining means along certain areas thereof.

9. The spline, as defined in claim 8 wherein said means for facilitating severing along certain areas comprises a reinforcing means secured to a portion of said retaining means.

10. The spline as defined in claim 8 wherein said means for facilitating severing includes perforated tear lines formed in said retaining means.

11. The spline as defined in claim 8 wherein said means for facilitating severing comprises tear string means operatively associated with said retaining means.

12. The spline as defined in claim 1 wherein said outer face means includes a central rib extending longitudinally of the outer face means.

13. A compressible spline for closing a gap between opposed side edges of adjacent spaced wall panels, the side edges of each panel having a substantially similar rigidified groove therein, the spline comprising a central compressible core with an enlarged body part having a front, back and sides, laterally projecting tongues extending from opposite sides of said body part and terminating in outer end surfaces, each said tongue having a reduced cross-section relative to said body part, a pair of relatively thin substantially rigid shells about the front, back and portions of each tongue, said shells terminating on said tongues in opposed facing end edges, the end edges of each shell about the portion of each tongue being spaced from each other to expose a substantial area of the outer end surface of the tongues and movable relative to one another to allow for compression and expansion of the compressible core, each said shell including an angularly inclined marginal edge portion along the opposite edges thereof directed inwardly over an associated tongue and toward the opposed facing end edge, said angularly inclined marginal edge portions defining guide surfaces to aid in inserting said tongues into position in the edge groove of a panel.

14. A compressible spline as in claim 13 wherein an outwardly projecting elongate rib is on opposite longitudinal edges of the shell means on at least the front thereof for locking cooperation with an undercut recess in said groove.

15. A compressible spline as in claim 13 wherein said compressible spline is generally T-shaped in cross-section, the cross on said T comprising the enlarged body part with the laterally projecting tongues on each side thereof.

16. The combination of a spline and adjacent wall panels comprising, a precompressed core formed of resilient compressible material, an outer face means disposed on one surface of said core and comprising a shell of relatively thin substantially rigid material, inner face means disposed on the opposite surface of said core and comprising a shell of relatively thin substantially rigid material, laterally extending tongues on opposite sides of said spline, retaining means disposed over at least one of said face means and over said laterally extending tongues to hold said spline in its precompressed condition, said retaining means being frangible such as to be readily broken to enable said resilient core to expand to move said face means apart relative to one another, and said adjacent panels having facing spaced side edges, said facing edges having longitudinally extending grooves therein receiving the laterally extending tongues at opposite sides of said spline.

17. The combination as defined in claim 16 wherein a horizontally extending rib is formed along opposite edges of at least the outer face means, and wherein each of said grooves includes a longitudinally extending recess for receiving one of said longitudinally extending ribs formed on the outer face means of said spline.

18. The combination as defined in claim 17 including sealing material disposed within each of said recesses to provide an air and watertight seal thereat.

19. The combination as defined in claim 16 including resilient gasket means disposed within each of said grooves and engaging said laterally extending tongues of said spline.

20. The combination of a spline and a pair of adjacent wall panels comprising a precompressed core formed of resilient compressible material, an outer face means disposed on one surface of said core and comprising a shell of relatively thin substantially rigid material, inner face means disposed on the opposite surface of said core and comprising a shell of relatively thin substantially rigid material, laterally extending tongues on opposite sides of said spline, retaining means disposed over at least one of said face means and over said laterally extending tongues to hold said spline in its precompressed condition, said retaining means being frangible such as to be readily broken to enable said resilient core to expand to move said face means apart relative to one another, each of said adjacent panels having facing spaced apart side edges, each of said edges having a longitudinally extending groove therein, said laterally extending tongues at opposite sides of said spline being received within said grooves, and means for facilitating severing of said retaining means along certain areas thereof so as to release the compressed spline and allow the spline to expand into operative position.

21. The combination as defined in claim 20 wherein each of said grooves includes a longitudinally extending recess formed therein, said outer face means including a pair of spaced longitudinally extending ribs each of which is received within one of said recesses.

22. The combination as defined in claim 21 including a sealing material disposed within each of said recesses for providing an air and watertight seal thereat.

23. The combination as defined in claim 20 including resilient gasket means disposed within each of said grooves and engageable with the laterally extending tongues on opposite sides of said spline.

24. The method of making a wall panel structure comprising the steps of: providing a pair of adjacent panels having spaced facing side edges, each of said edges having a longitudinally extending groove formed therein, providing a spline including a resilient compressible central core and having a relatively thin rigid outer face means on one side thereof and a relatively thin rigid inner face means on the other side thereof, said spline including laterally extending tongues on opposite sides thereof extending laterally outwardly of said inner face means, moving said inner and outer face means toward one another to compress said resilient compressible core of the spline, providing retaining means for retaining the central core of the spline in compressed condition, inserting the spline in position with opposite laterally extending tongues of the spline disposed within grooves of the adjacent panels, and then severing the retaining means and allowing the spline to expand into its final operative position.

25. The method as defined in claim 24 wherein said retaining means is severed by manually tearing the retaining means.

26. The method as defined in claim 24 wherein said retaining means is severed by cutting the retaining means with a suitable tool.

References Cited
UNITED STATES PATENTS

| | | | |
|---|---|---|---|
| 2,075,262 | 3/1937 | Boettner | 52—99 |
| 2,465,603 | 3/1949 | Dotchen | 52—495 |
| 2,941,660 | 6/1960 | Tupper | 206—46 |
| 3,119,204 | 1/1964 | Williams | 52—396 |
| 3,175,652 | 3/1965 | Brekell et al. | 52—586X |
| 3,286,425 | 11/1966 | Brown | 52—396 |
| 3,310,917 | 3/1967 | Simon | 52—586X |
| 3,411,252 | 11/1968 | Boyce | 52—495X |
| 3,434,589 | 3/1969 | Valtri et al. | 206—46 |

FOREIGN PATENTS

| | | | |
|---|---|---|---|
| 562,548 | 12/1957 | Belgium | 52—472 |
| 1,165,670 | 10/1958 | France | 52—403 |

FRANK L. ABBOTT, Primary Examiner

S. D. BURKE, III, Assistant Examiner

U.S. Cl. X.R.
52—98, 403, 586